US007091145B2

(12) United States Patent
Wolff et al.

(10) Patent No.: US 7,091,145 B2
(45) Date of Patent: Aug. 15, 2006

(54) LEAD-FREE AND PREFERABLY ARSENIC-FREE LANTHANUM HEAVY FLINT GLASS

(75) Inventors: Silke Wolff, Hueckeswagen (DE); Ute Woelfel, Mainz (DE)

(73) Assignee: Schott AG, Mainz (DE)

( * ) Notice: Subject to any disclaimer, the term of this patent is extended or adjusted under 35 U.S.C. 154(b) by 201 days.

(21) Appl. No.: 10/462,451

(22) Filed: Jun. 16, 2003

(65) Prior Publication Data

US 2004/0023787 A1 Feb. 5, 2004

(30) Foreign Application Priority Data

Jun. 19, 2002 (DE) ................................ 102 27 494

(51) Int. Cl.
*C03C 3/068* (2006.01)
*C03C 3/066* (2006.01)

(52) U.S. Cl. .......................................... 501/78; 501/79

(58) Field of Classification Search ................ 501/78, 501/79
See application file for complete search history.

(56) References Cited

U.S. PATENT DOCUMENTS

| 4,472,511 A | * | 9/1984 | Mennemann et al. ......... 501/78 |
| 4,584,279 A | * | 4/1986 | Grabowski et al. ........... 501/78 |
| 5,121,176 A | * | 6/1992 | Quigg ........................ 257/340 |

FOREIGN PATENT DOCUMENTS

| DE | 691 356 | | 5/1940 |
| DE | 1 047 994 | | 4/1957 |
| DE | 31 38 137 A1 | | 4/1983 |
| DE | 34 31 215 A1 | | 3/1985 |
| DE | 4222322 | * | 2/1993 |
| DE | 4242859 | * | 2/1994 |
| GB | 2 106 496 A | | 4/1983 |
| GB | 2 137 981 A | | 10/1984 |
| GB | 2 150 555 A | | 7/1985 |
| GB | 2 337 046 A | | 11/1999 |
| JP | 53-4023 | | 1/1978 |
| JP | 55-121925 | | 9/1980 |
| JP | 59-50048 | | 3/1984 |
| JP | 60033229 A | | 2/1985 |
| JP | 2000128570 A | | 5/2000 |

OTHER PUBLICATIONS

Patent Abstracts of Japan JP 60 221 338 A, Nov. 6, 1985.
Patent Abstract of Japan JP 60 046 948 A, Mar. 14, 1985.

* cited by examiner

*Primary Examiner*—Karl Group
(74) *Attorney, Agent, or Firm*—Michael J. Striker

(57) ABSTRACT

The lead-free and arsenic-free optical glass has a refractive index $n_d$ of $1.84 \leq n_d \leq 1.96$ and an Abbé number $v_d$ of $27 \leq v_d \leq 36$, with good chemical resistance, excellent crystallization resistance and the following composition (in % by weight based on oxide): $SiO_2$, 1 to 8, $B_2O_3$, 13 to 19.5, $La_2O_3$, 34 to 50; MgO, 0 to 6, CaO, 0 to 6, BaO, 0 to 6, ZnO, 0 to 9 with $\Sigma MO$, 1 to 10; and $TiO_2$, 4 to 15, $ZrO_2$, 0 to 11, $Nb_2O_5$, 6 to 14.5. In addition, the glass according to the invention, as well as having a maximum alkali metal oxide content of 10% by weight, may also contain standard refining agents other than arsenic. The glass according to the invention is used in imaging, projection, telecommunications, optical communication and/or laser technology.

14 Claims, No Drawings

LEAD-FREE AND PREFERABLY ARSENIC-FREE LANTHANUM HEAVY FLINT GLASS

BACKGROUND OF THE INVENTION

1. Field of the Invention

The present invention relates to lead-free and preferably also arsenic-free lanthanum heavy flint glass with a refractive index $n_d$ of $1.84 \leq n_d \leq 1.96$ and an Abbé number $v_d$ of $27 \leq v_d \leq 36$, and to the uses of this glass.

2. Description of the Related Art

Conventional optical glass in the lanthanum-heavy flint range with a low Abbé number for the application areas of imaging, projection, telecommunications, optical communication technology and laser technology generally contains PbO, in order to achieve the desired optical properties, i.e. a refractive index $n_d$ of $1.84 \leq n_d \leq 1.96$ and, in particular, the high dispersion, i.e. a low Abbé number $v_d$ of $27 \leq v_d \leq 36$. However, PbO reduces the chemical resistance of these types of glass. Furthermore, materials with high chemical resistance are becoming increasingly important for use in high added value products. Moreover, $As_2O_3$ is often used as a refining agent. Since in recent years the glass components PbO and $As_2O_3$ have been regarded as environmentally harmful, most manufacturers of optical instruments and products tend preferably to use lead-free and arsenic-free glass.

Known lead-free glass compositions with a high refractive index and a low Abbé number generally contain extremely large quantities of $TiO_2$ in a silicate matrix, which leads to glass, which is very highly susceptible to crystallization and extremely difficult to process.

In addition, in terms of melting technology there have recently been reports of increased demand for "short" glass, i.e. for glass whose viscosity varies extremely strongly with the temperature. During the manufacturing process, this characteristic has the advantage that the hot-shaping times, i.e. the mold-closed times, can be reduced. This firstly increases throughput and secondly protects the mold material, with the result that total production costs can be reduced considerably. Also, the more rapid cooling which is thereby made possible also allows glass with a relatively strong tendency to crystallize to be processed, i.e. correspondingly longer glass, and means that preliminary nucleation, which could cause problems in subsequent secondary hot-forming steps, is avoided.

Therefore, a composition range for short optical glass, which allows the desired optical properties with regard to $n_d$ and $v_d$ to be achieved, even without use of PbO and $As_2O_3$, and furthermore with a reduced $TiO_2$ content, would be advantageous.

However glass with a similar optical position or comparable chemical composition, which has hitherto been disclosed in the prior art, has serious drawbacks.

For example, DE 691 356 (Eastman Kodak) describes silicate-free lanthanum borate glass for achieving a similar optical position, namely a very high refractive index with an extremely low dispersion (i.e. a high Abbé number), but this glass is at very great risk of crystallizing. Moreover, to stabilize this glass it is preferable to introduce very expensive tantalum oxide (or optionally highly toxic thorium oxide or expensive tungsten oxide) as crystallization inhibitor. Furthermore, when $SiO_2$ is used without the addition of alkali metal oxides, opacification phenomena have been described, and consequently the use of silicate is obligatorily linked to the addition of alkali metals.

In a corresponding way to the document discussed above, JP 78-004023 A (Ohara) also describes glass with an extremely low dispersion and very high refractive index. The glass described differs from the glass described in DE 691 356 through the obligatory requirement that hafnium must be used to stabilize the lanthanum borate matrix. However, on account of the difficulty of purifying raw materials, this component is extremely expensive. Moreover, it has a very high melting point (melting point 3050° C.) compared to its more usual homolog $TiO_2$ (melting point 1560° C.) and $ZrO_2$ (melting point 1700° C.) with comparable physico-chemical characteristics. The result of this is that the melting process is made considerably more difficult by additions of hafnium oxide.

JP 84-050048 A (Ohara) describes silicate-containing (>8% by weight) lanthanum borate glasses, without alkali metal oxides necessarily being added. Since the solubility of lanthanum oxide in a borosilicate matrix is significantly worse than in a pure borate matrix, the maximum amount of lanthanum, which can be used in this glass, is limited. Therefore, the result is either glass whose refractive indices are lower on account of a lower $La_2O_3$ content or whose crystallization resistance is adversely affected by increasing the refractive index with additional oxides.

DE 31 38 137 (SCHOTT GLAS) relates to glass with an extremely low dispersion combined, at the same time, with a high refractive index. The stabilizing effect with respect to the tendency to crystallize caused by the use of silicate without alkali metals is achieved by adding large amounts of $Nb_2O_5$ ($\geq 15\%$ by weight). The glass described in this patent differs from that of DE 691 356 by the use of silicate in the absence of alkali metals and tantalum. However, since $Nb_2O_5$ is a relatively expensive component, such high levels of $Nb_2O_5$ are not economical.

DE 10 47 994 (Izumitani, et al) deals with lanthanum borate glass with a particularly high borate content ($\geq 20\%$ by weight). Although this has a positive influence on the solubility of lanthanum and therefore reduces the tendency to crystallize when silicate is used at the same time, the maximum refractive index, which can be reached, is reduced to below 1.87. Therefore, the glass described in this document tends to be designed for moderate optical applications with good chemical resistance, high grinding hardness, i.e. good machining properties, and low crystallization, rather than to achieve a high refractive index combined with a low dispersion.

SUMMARY OF THE INVENTION

Therefore, the object of the present invention is to provide lead-free and preferably also arsenic-free optical glass for the following application areas: imaging, projection, telecommunications, optical communication technology and/or laser technology and to provide glass with a refractive index $n_d$ of $1.84 \leq n_d \leq 1.96$ and an Abbé number $v_d$ of $27 \leq v_d \leq 36$, which has good melting and processing properties. Furthermore, this glass should have a good chemical resistance and sufficient crystallization resistance, so that it can be produced in continuously operated installations.

The above object is achieved by the embodiments of the present invention, which are described in the claims.

In particular, the glass of the present invention has a refractive index $n_d$ of $1.84 \leq n_d \leq 1.96$ and an Abbé number $v_d$ of $27 \leq v_d \leq 36$, and is characterized by the following composition (in % by weight, based on oxide):

| | |
|---|---|
| SiO$_2$ | 1 to 8, |
| B$_2$O$_3$ | 13 to 19.5, |
| La$_2$O$_3$ | 34 to 50, |
| MgO | 0 to 6, |
| CaO | 0 to 6, |
| BaO | 0 to 6, |
| ZnO | 0 to 9, |
| TiO$_2$ | 4 to 13, |
| ZrO$_2$ | 0 to 11, |
| Nb$_2$O$_5$ | 6 to 14.5, | wherein a sum total amount of MgO+CaO+BaO+ZnO is from 1 to 10.

According to another embodiment of the present invention, the glass has a refractive index $n_d$ of $1.84 \leq n_d \leq 1.96$ and an Abbé number $v_d$ of $27 \leq v_d \leq 36$, and having a composition, in percent by weight based on oxide content, comprising:

| | |
|---|---|
| SiO$_2$ | 1 to 8, |
| B$_2$O$_3$ | 13 to 19.5, |
| La$_2$O$_3$ | 34 to 50, |
| MgO | 0 to 6, |
| CaO | 0 to 6, |
| BaO | 0 to 6, |
| ZnO | 0 to 9, |
| TiO$_2$ | 4 to 15, |
| ZrO$_2$ | 0 to 11, |
| Nb$_2$O$_5$ | 6 to 14.5, | wherein a sum total amount of MgO+CaO+BaO+ZnO is from 1 to 10.

According to the present invention, the details given with regard to the weight of the components are in each case based on oxide unless stated otherwise.

The glass according to the invention has the same optical data as known optical glass of this optical position. However, it is also distinguished by good chemical resistance and processing properties, lower production costs on account of reduced raw material and process costs, crystallization resistance, which is sufficient on account of the glass being short, and by good environmental compatibility.

The glass according to the invention satisfies both the requirement for good melting and processing properties, with a refractive index $n_d$ of $1.84 \leq n_d \leq 1.96$, preferably $1.85 \leq n_d \leq 1.95$, particularly preferably $n_d$ of $1.86 \leq n_d \leq 1.94$, and most preferably $n_d$ of $1.88 \leq n_d \leq 1.93$, and an Abbé number $v_d$ of $27 \leq v_d \leq 36$, preferably $28 \leq v_d \leq 35$, particularly preferably $28 \leq v_d \leq 34$, and most preferably $29 \leq v_d \leq 33$. The glass according to the invention also has good chemical resistance and resistance to crystallization, as required, while at the same time does not contain PbO, and preferably also not any As$_2$O$_3$.

The basic glass system is a lanthanum borate glass, the borate being responsible for the solubility of the lanthanum. It has been found that stable glass is formed at La$_2$O$_3$:B$_2$O$_3$ ratios of $\leq 3.0$. The range, which is preferred according to the invention, starts at La$_2$O$_3$:B$_2$O$_3$ of around, approximately 2.6. Although lower ratios are desirable with regard to resistance to crystallization, they would require significantly higher absolute borate contents, with the result that it would no longer be possible to introduce sufficient amounts of highly refractive components, which do not promote crystallization to achieve the refractive index position, which is desired in the present context.

To achieve the desired optical position, the glass according to the invention contains a La$_2$O$_3$ content of at least 34 percent by weight, preferably at least 37 percent by weight, more preferably at least 39 percent by weight, most preferably at least 40 percent by weight. The La$_2$O$_3$ content is at most 50 percent by weight, preferably at most 47 percent by weight, particularly preferably at most 45 percent by weight, most preferably at most 44 percent by weight.

According to the invention, the B$_2$O$_3$ content is preferably at least 13% by weight, preferably at least 15% by weight, more preferably at least 16% by weight, most preferably at least 17% by weight. The glass according to the invention contains at most 19.5% by weight, preferably at most 19% by weight of B$_2$O$_3$.

The glass according to the invention is restricted to SiO$_2$ contents of at most 8% by weight, allowing up to 50% by weight of lanthanum oxide to be used. Therefore, there is no need to add further components, which increase the refractive index but promote crystallization in order to achieve the high refractive index positions.

Therefore, the glass according to the invention contains only small amounts of the glass former SiO$_2$, i.e. at most 8% by weight, preferably at most 7.5% by weight, more preferably at most 7% by weight, most preferably at most 6% by weight. However, the glass according to the invention always contains small quantities of SiO$_2$, in an amount of at least 1% by weight, preferably at least 3% by weight, particularly preferably at least 4% by weight. This low SiO$_2$ content is used to improve the processing properties by increasing the mechanical strength of the material. For example, good abrasion hardness and chemical resistance can be achieved as a function of the quantity used. However, the amount of SiO$_2$ added must be restricted to the upper limit described above, since otherwise the solubility of the lanthanum in the matrix is reduced. This in turn leads to glasses which lack resistance to crystallization or, if the La$_2$O$_3$ content has been reduced in favor of the SiO$_2$ content, to lower refractive indices and to shifts of the overall optical position.

The most important optical component of the glass according to the invention, i.e. the component, which has a major influence on achieving the desired optical position with a high refractive index and a low Abbé number, is Nb$_2$O$_5$. Further Nb$_2$O$_5$ stabilizes the silicate-containing lanthanum borate glass matrix. This component is present in an amount of at least 6% by weight, preferably at least 8% by weight, particularly preferably at least 9% by weight, most preferably at least 10% by weight, in the glass. This component is present in the glass according to the invention at most in an amount of 14.5% by weight, preferably 14% by weight, and particularly preferably 13% by weight. Increasing the amount of this component to above 14.5% by weight would lead to increased batch preparation costs. Furthermore, on account of the glass being short, there is no need to exploit the further stabilizing effect in the processes. Reducing the level of this component to below 6% by weight would increase the likelihood of crystallization to such an extent that it would only be possible to obtain a glass with considerable difficulty.

The glass according to the invention is what is known as a "short glass"; this expression is understood as meaning that the viscosity of the glass drops relatively quickly as the temperature falls or increases relatively quickly as the temperature rises.

This "shortness" of the glass according to the invention is achieved by the combination of a defined quantity of $TiO_2$ with a defined quantity of one or more alkaline-earth metal oxides.

The amount of $TiO_2$ in the glass according to the invention is at most 15% by weight, preferably at most 13% by weight, particularly preferably at most 12% by weight, most preferably 11% by weight. Increasing the $TiO_2$ content to over 15% by weight would firstly lead to the viscosity-temperature profile being made undesirably extreme, i.e. the glass would become so "short" that it would be difficult to process under standard conditions. Furthermore, such a high $TiO_2$ content would detrimentally lead to a considerable increase in the tendency of the glass to crystallize. Therefore, according to preferred embodiments, $TiO_2$ may if appropriate be partially replaced by $ZrO_2$ (0–11% by weight, preferably 1–9% by weight, particularly preferably 2–9% by weight, most preferably 3–8% by weight). Furthermore, $TiO_2$ content over 15% by weight would result in an Abbé number, which is too low for the desired application areas, i.e. in excessively high dispersion. The glass contains at least 4% by weight, preferably at least 6% by weight, particularly preferably at least 7% by weight, most preferably 8% by weight, of this component. By contrast, reducing the content of this component to below 4% by weight would lead to there being insufficient amounts of this component to obtain a sufficiently "short" glass, and the Abbé numbers would be too high.

According to the present invention, the glass according to the invention also contains alkaline-earth metal oxides. The use of the alkaline-earth metal oxides in combination with the addition of $TiO_2$ modifies the viscosity-temperature profile. Therefore, it is possible to use any alkaline-earth metal oxide individually or a mixture of two or more alkaline-earth metal oxides within a wide range. However, the total amount of alkaline-earth metal oxides must not exceed an amount of 10% by weight, preferably 9% by weight. To achieve the purpose of the invention, the glass according to the invention contains at least 1% by weight, preferably at least 2% by weight, of alkaline-earth metal oxides.

However, since these components may also have an influence on the optical position, MgO and CaO, as components with a low refractive index, are only present in the glass according to the invention in an amount of in each case at most 6% by weight, preferably in each case at most 4% by weight. Therefore, particularly preferred variants of the glass according to the invention are substantially free of these components. Therefore, according to the present invention, the alkaline-earth metal oxides contained in the glass according to the invention are preferably the components BaO and/or ZnO, which have a higher refractive index. BaO is preferably present in an amount of at most 6% by weight, preferably at most 4% by weight, most preferably at most 3% by weight, in the glass according to the invention. The glass according to the invention preferably contains at least 1% by weight of BaO. The glass according to the invention contains ZnO in an amount of preferably at most 9% by weight, for preference at most 7% by weight, most preferably at most 6% by weight, and preferably in an amount of at least 1% by weight. It has been found that in particular ZnO appears to act as a crystallization inhibitor. It is therefore particularly preferred to add at least one of these alkaline-earth metal components.

The glass according to the invention may also contain an addition of alkali metal oxides, which, however, do not produce any stabilization of the glass in the small quantities, which are the maximum permitted. However, adding larger amounts would lead to reductions in the refractive index. However, alkali metal oxides of this type may be necessary for certain applications, if glass properties such as, for example, an ion exchange capacity or slight variations to the viscosity-temperature profile towards flexible, near net shape hot forming are desired.

Therefore, in addition to the components mentioned above, the glass according to the invention may, if appropriate, contain a total of at most 10% by weight, preferably at most 8% by weight, of alkali metal oxides, i.e. $Na_2O$, $Li_2O$, $K_2O$ and $Cs_2O$.

Furthermore, standard refining agents may also be present, but it is preferable for the refining agents used not to be arsenic compounds. In particular, the following components, individually or as a mixture, may be present as refining agents (in % by weight):

| | |
|---|---|
| $Sb_2O_3$ | 0–1, |
| SnO | 0–1, |
| NaCl | 0–1, |
| $SO_4^-$ | 0–1, |
| and/or $F^-$ | 0–1. |

According to a preferred embodiment, the glass according to the invention is preferably also substantially free of arsenic and arsenic compounds. The glass according to the invention, with a relatively moderate optical position with regard to the dispersion, ia also sufficiently resistant to crystallization, even when silicate is included (at most 8% by weight) without any addition of alkali metals. It is assumed that this is the case because of their "shortness". It is possible to dispense with expensive (or toxic) additions of $Ta_2O_5$, $WO_3$ and/or thorium oxide; potentially inexpensive and ecologically harmless alkaline-earth metal oxides are used to stabilize the glass according to the invention. Therefore, the glass according to the invention is preferably also free of $Ta_2O_5$, $WO_3$ and/or thorium oxide.

The present invention also relates to the use of the glass compositions according to the invention in the application areas of imaging, projection, telecommunications, optical communications technology and/or laser technology.

Furthermore, the present invention relates to optical elements, which comprise a glass according to the invention. Optical elements in this context may in particular be lenses and prisms, although they are not restricted to these particular examples. Furthermore, the term "optical elements" also encompasses what are known as compact components.

EXAMPLES

The glass according to the invention are produced in the following way:

The raw materials for the oxides, preferably carbonates, nitrates and/or fluorides, are weighed out, one or more refining agents, such as for example $Sb_2O_3$, is/are added and the materials are then intimately mixed. The glass batch is melted at approx. 1300° C. in a continuous melting unit, then refined (1350° C.) and homogenized. The glass is cast at a casting temperature of approximately 1220° C. and processed into the desired dimensions.

TABLE 1

MELTING EXAMPLE FOR 100 kg (calculated) of GLASS

| OXIDE | % by weight | Raw Material | Amount of raw material, kg |
|---|---|---|---|
| $SiO_2$ | 3.0 | $SiO_2$ | 3.00 |
| $B_2O_3$ | 20.0 | $H_3BO_3$ | 35.53 |
| $La_2O_3$ | 46.7 | $La_2O_3$ | 46.70 |
| ZnO | 6.0 | ZnO | 6.00 |
| BaO | 0.2 | $Ba(NO_3)_2$ | 0.34 |
| BaO | 3.8 | $BaCO_3$ | 4.89 |
| $TiO_2$ | 8.0 | $TiO_2$ | 8.00 |
| $Nb_2O_5$ | 12.0 | $Nb_2O_5$ | 12.00 |
| $Sb_2O_3$ | 0.3 | $Sb_2O_3$ | 0.30 |
| Total | 100.0 | | 116.76 |

The properties of the glass obtained in this way are given in Table 2, Example 3.

Table 2 includes examples 1 to 7 of the glass compositions according to the invention and their measured optical properties.

The exemplary glass compositions 1 to 7 (Table 2) according to the invention have crystallization resistances and viscosity-temperature profiles such that further heat treatment (extrusion or repressing) of the glass is readily possible.

In comparative example 1, which is not covered by the composition range according to the invention, the desired optical position can only be achieved by adding a considerable amount of expensive $Nb_2O_5$.

TABLE 2

Melting Examples (in % by weight)

| | Example 1 17181 | Example 2 17182 | Example 3 17183 | Example 4 17184 | Example 5 17185 | Example 6 17187 | Example 7 16250 | Comparative Example 1 15988 |
|---|---|---|---|---|---|---|---|---|
| $SiO_2$ | 4.0 | 8.0 | 3.0 | 5.0 | 6.0 | 4.0 | 6.0 | 3.0 |
| $B_2O_3$ | 16.0 | 20.0 | 20.0 | 19.0 | 15.0 | 19.0 | 18.0 | 21.0 |
| $La_2O_3$ | 41.0 | 37.0 | 47.0 | 45.0 | 39.0 | 44.0 | 41.0 | 50.0 |
| $Na_2O$ | | | | 3.0 | 2.0 | | | |
| MgO | | 2.0 | | | 2.0 | 4.0 | | |
| CaO | 2.0 | | | | 2.0 | 4.0 | | |
| BaO | | 4.0 | 4.0 | 2.0 | 4.0 | | 2.0 | |
| ZnO | 7.0 | | 6.0 | 6.0 | 4.0 | 1.0 | 5.0 | |
| $TiO_2$ | 13.0 | 6.0 | 8.0 | 10.0 | 8.0 | 9.0 | 9.0 | 4.0 |
| $ZrO_2$ | 7.0 | 9.0 | | 2.0 | 6.0 | 5.0 | 6.0 | 5.0 |
| $Nb_2O_5$ | 10.0 | 14.0 | 12.0 | 8.0 | 12.0 | 10.0 | 13.0 | 17.0 |
| $Sb_2O_3$ | 0.3 | 0.3 | 0.3 | 0.3 | 0.3 | 0.3 | 0.3 | 0.3 |
| Total | 100.3 | 100.3 | 100.3 | 100.3 | 100.3 | 100.3 | 100.3 | 100.3 |
| $n_d$ | 1.9448 | 1.9064 | 1.8908 | 1.8583 | 1.8772 | 1.8774 | 1.9144 | 1.9054 |
| $V_d$ | 29.25 | 30.27 | 32.92 | 33.04 | 32.75 | 33.62 | 31.61 | 33.07 |
| $P_{g,F}$ | 0.6008 | 0.5845 | 0.5907 | 0.5905 | 0.5916 | 0.5882 | 0.5937 | 0.5888 |
| $\Delta P_{g,F} (10^{-1})$ | 62 | 42 | 23 | 23 | 29 | 9 | 31. | 6 |
| $\rho$ (g/cm$^3$) | 4.54 | 4.18 | 4.56 | 4.32 | 4.38 | 4.31 | 4.49 | 4.58 |
| $\alpha_{28-300} (10^{-6} * K^{-1})$ | 7.6 | 7.0 | 7.7 | 8.4 | 8.5 | 8.2 | 7.2 | 7.2 |
| Tg (° C.) | 640 | 660 | 636 | 591 | 616 | 650 | 645 | 660 |

The disclosure in German Patent Application 102 27 494.0-45 of Jun. 19, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a lead-free and preferably also arsenic-free lanthanum heavy flint glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. Lead-free and arsenic-free optical glass with a refractive index $n_d$ of $1.84 \leq n_d \leq 1.96$ and an Abbé number $v_d$ of $27 \leq v_d \leq 36$, and having a composition free of arsenic and lead and, in percent by weight based on oxide content, comprising:

| | |
|---|---|
| $SiO_2$ | 1 to 8, |
| $B_2O_3$ | 13 to 19.5, |
| $La_2O_3$ | 34 to 50, |
| MgO | 0 to 6, |
| CaO | 0 to 6, |
| BaO | 0 to 6, |
| ZnO | 0 to 9, |
| $TiO_2$ | 4 to 13, |
| $ZrO_2$ | 0 to 11, |
| $Nb_2O_5$ | 6 to 14.5, | wherein a sum total amount of MgO+CaO+BaO+ZnO is from 1 to 10.

2. Lead-free and arsenic-free optical glass with a refractive index $n_d$ of $1.85 \leq n_d \leq 1.95$ and an Abbé number $v_d$ of $28 \leq v_d \leq 35$, and having a composition free of arsenic and lead and, in percent by weight based on oxide content, comprising:

| | |
|---|---|
| $SiO_2$ | 3 to 7.5, |
| $B_2O_3$ | 15 to 19.5, |
| $La_2O_3$ | 37 to 47, |
| MgO | 0 to 4, |

-continued

| | |
|---|---|
| CaO | 0 to 4, |
| BaO | 0 to 4, |
| ZnO | 0 to 7, |
| $TiO_2$ | 6 to 13, |
| $ZrO_2$ | 1 to 9, |
| $Nb_2O_5$ | 8 to 14, | wherein a sum total amount of MgO+CaO+BaO+ZnO is from 2 to 10.

3. Lead-free and arsenic-free optical glass with a refractive index $n_d$ of $1.86 \leq n_d \leq 1.94$ and an Abbé number $v_d$ of $28 \leq v_d \leq 34$, and having a composition free of arsenic and lead and, in percent by weight based on oxide content, comprising:

| | |
|---|---|
| $SiO_2$ | 4 to 7, |
| $B_2O_3$ | 16 to 19.5, |
| $La_2O_3$ | 39 to 45, |
| MgO | 0 to 4, |
| CaO | 0 to 4, |
| BaO | 1 to 4, |
| ZnO | 2 to 9, |
| $TiO_2$ | 7 to 12, |
| $ZrO_2$ | 2 to 9, |
| $Nb_2O_5$ | 9 to 13, | wherein a sum total amount of MgO+CaO+BaO+ZnO is from 2 to 9.

4. Lead-free and arsenic-free optical glass with a refractive index $n_d$ of $1.88 \leq n_d \leq 1.93$ and an Abbé number $v_d$ of $29 \leq v_d \leq 33$, and having a composition free of arsenic and lead and, in percent by weight based on oxide content, comprising:

| | |
|---|---|
| $SiO_2$ | 4 to 6, |
| $B_2O_3$ | 17 to 19, |
| $La_2O_3$ | 40 to 44, |
| BaO | 1 to 3, |
| ZnO | 1 to 6, |
| $TiO_2$ | 7 to 11, |
| $ZrO_2$ | 3 to 8, |
| $Nb_2O_5$ | 10 to 13. |

5. Glass as defined in claim 1, further comprising up to 10 percent by weight of alkali metal oxides and said alkali metal oxides comprise $Na_2O$, $Li_2O$, $K_2O$ and $Cs_2O$.

6. Glass as defined in claim 1, further comprising, as refining agent, up to one percent by weight of at least one of $Sb_2O_3$, SnO, NaCl, $SO_4^-$ and $F^-$.

7. Lead-free and arsenic-free optical glass with a refractive index $n_d$ of $1.84 \leq n_d \leq 1.96$ and an Abbé number $v_d$ of $27 \leq v_d \leq 36$, and having a composition free of arsenic and lead, in percent by weight based on oxide content, comprising:

| | |
|---|---|
| $SiO_2$ | 1 to 8, |
| $B_2O_3$ | 13 to 19.5, |
| $La_2O_3$ | 34 to 50, |
| MgO | 0 to 6, |
| CaO | 0 to 6, |
| BaO | 0 to 6, |
| ZnO | 0 to 9, |
| $TiO_2$ | 4 to 15, |
| $ZrO_2$ | 0 to 11, |
| $Nb_2O_5$ | 6 to 14.5, | wherein a sum total amount of MgO+CaO+BaO+ZnO is from 1 to 10.

8. Glass as defined in claim 7, further comprising up to 10 percent by weight of alkali metal oxides and said alkali metal oxides comprise $Na_2O$, $Li_2O$, $K_2O$ and $Cs_2O$.

9. Glass as defined in claim 7, further comprising, as refining agent, up to one percent by weight of at least one of $Sb_2O_3$, SnO, NaCl, $SO_4^-$ and $F^-$.

10. A glass for imaging, projection, telecommunications, optical communication technology or laser technology, said glass consisting of the glass as defined in claim 1.

11. An optical element comprising the glass as defined in claim 1.

12. Lead-free and arsenic-free optical glass with a refractive index $n_d$ of $1.84 \leq n_d \leq 1.96$ and an Abbé number $v_d$ of $27 \leq v_d \leq 36$, and having a composition free of arsenic and lead and, in percent by weight based on oxide content, consisting of:

| | |
|---|---|
| $SiO_2$ | 1 to 8, |
| $B_2O_3$ | 13 to 19.5, |
| $La_2O_3$ | 34 to 50, |
| MgO | 0 to 6, |
| CaO | 0 to 6, |
| BaO | 0 to 6, |
| AnO | 0 to 9, |
| $TiO_2$ | 4 to 13, |
| $ZrO_2$ | 0 to 11, |
| $Nb_2O_5$ | 6 to 14.5, |
| $Li_2O + Na_2O + K_2O + Cs_2O$ | 0 to 10, and |
| at least one refining agent | 0 to 1, and | wherein a sum total amount of MgO+CaO+BaO+ZnO is from 1 to 10; and wherein said at least one refining agent is selected from the group consisting of $Sb_2O_3$, SnO, NaCl, $SO_4^-$ and $F^-$.

13. Lead-free and arsenic-free optical glass with a refractive index $n_d$ of $1.84 \leq n_d \leq 1.96$ and an Abbé number $v_d$ of $27 \leq v_d \leq 36$, and having a composition free of arsenic and lead and, in percent by weight based on oxide content, comprising:

| | |
|---|---|
| $SiO_2$ | 1 to 8, |
| $B_2O_3$ | 13 to 19.5, |
| $La_2O_3$ | 34 to 50, |
| MgO | 0 to 6, |
| CaO | 0 to 6, |
| BaO | 1 to 6, |
| ZnO | 1 to 9, |
| $TiO_2$ | 4 to 13, |
| $ZrO_2$ | 0 to 11, |
| $Nb_2O_5$ | 6 to 14.5, | wherein a sum total amount of MgO+CaO+BaO+ZnO is from 2 to 10.

14. Glass as defined in claim 13, wherein said MgO and said CaO are each present in an amount of from 0 to 2 percent by weight and said BaO and said ZnO are each present in an amount of from 2 to 6% by weight.

* * * * *